May 21, 1929.　　　J. A. ANDERSON　　　1,713,638
AUTOMATIC TAKE-UP BEARING
Filed Nov. 26, 1926
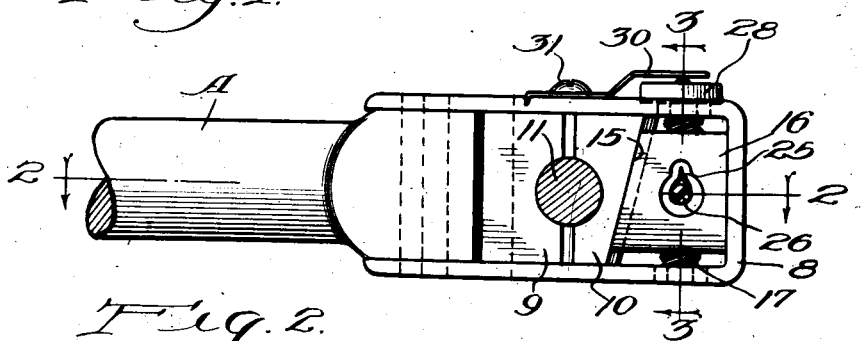
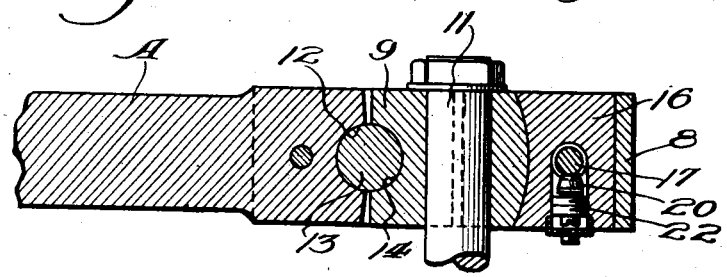
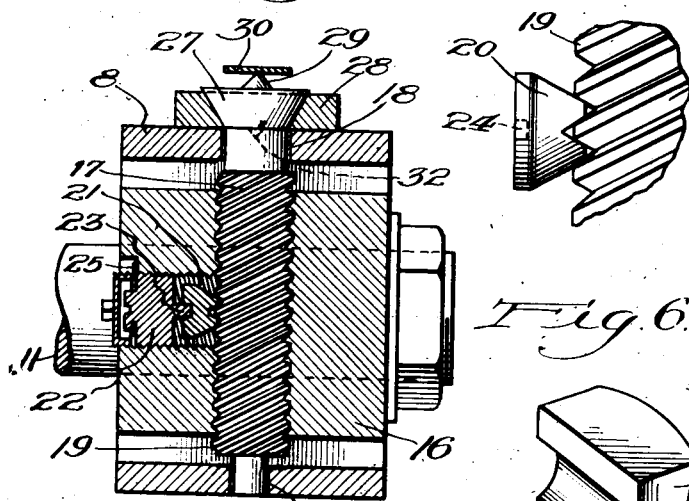
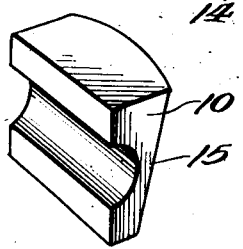
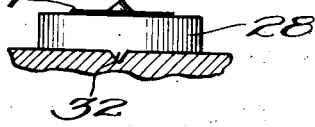

Patented May 21, 1929.

1,713,638

UNITED STATES PATENT OFFICE.

JOHN A. ANDERSON, OF GENESEO, ILLINOIS, ASSIGNOR TO BARTLETT S. GRAY, TRUSTEE, OF GENESEO, ILLINOIS.

AUTOMATIC TAKE-UP BEARING.

Application filed November 26, 1926. Serial No. 150,882.

This invention relates to a bearing having a member which is adjustable toward a rotating part journaled in the bearing, and is concerned more particularly with means associated with said adjustable member for advancing the same automatically as wear occurs upon the surfaces under friction. It may be employed advantageously for many purposes and particularly so in connection with a split bearing such as is commonly used in the connecting rods of many kinds of engines. In the description to follow reference will be made to the present bolt in relation to a conventional connecting rod, although, as above suggested, it may be applied to other uses as well.

It is an object of my invention to provide simple and effective means which will act automatically to take up bearing wear occasioned through usage, thereby preventing development of play or lost motion. The means devised for this purpose includes a bolt having an associated spring for imparting rotation thereto, and a wedge block which is advanced by the bolt against a movable bearing part whenever permitted to do so by the development of wear or play. The parts for this purpose are also so combined and associated as to utilize forces of momentum which are generated in a connecting rod bearing as the crank pin is revolved through its movement cycle. According to this invention an advance of the adjustable bearing member to a new position will be maintained against reactive forces of momentum occurring during each movement cycle of the rod. Furthermore, the parts which act to advance such an adjustable bearing member are themselves prevented from developing play, so that pressure once placed upon the bearing member will remain thereafter constant and non-variable.

It is with objects such as these that the present improvements are concerned. Other advantages are also derived from the invention as will be pointed out hereinafter in the specification and claims. An embodiment of my invention is set forth in the accompanying drawing in the manner following:

Figure 1 is a side elevation of one end of a connecting rod equipped with the automatic take-up bearing of my invention;

Fig. 2 is a longitudinal section therethrough taken on line 2—2 of Fig. 1;

Fig. 3 is an enlarged detail in transverse section taken on line 3—3 of Fig. 1;

Fig. 4 is an enlarged fragmentary detail showing the threaded connection between the adjustable jaw and the take-up bolt;

Fig. 5 is a perspective view of one bearing member which occupies a fixed position;

Fig. 6 is a similar view of the co-operating bearing member which is movable toward and from the other; and Fig. 7 is an enlarged detail showing in elevation the collar wherein is seated the bolt head.

As illustrative of one type of apparatus with which my invention may be successfully used, I have shown in the drawing a connecting rod A having at one end a strap 8 providing a mounting for a pair of bearing members 9 and 10 in which is journaled a crank pin 11. One end of the connecting rod may be recessed at 12 to partly receive a pin 13 transversely related to the crank pin 11. The pin 13 may lie in part within a similar recess 14 in the proximate bearing member 9. The connecting rod end may be slightly curved adjacent the bearing member 9 to permit of a slight oscillation of the latter relative to the former about the axis of the pin 13.

The two bearing members in which the crank pin 11 is journaled may be slightly separated in accordance with usual practice whereby the member 10 is adjustable toward the other as wear occurs. To bring about this result, the outer face 15 of the bearing member 10 is inclined to provide a wedge face and may also be curved longitudinally of its inclination about an axis which is substantially coincident with that of the pin 13. By this means the two bearing members 9 and 10 are permitted to swing upon this pin as an axis whenever required to do so in order to adjust themselves to any variations in the position of the crank pin 11. Co-operating with the adjustable bearing member 10 is a wedge block 16 which is fitted in place adjacent the end of the strap 8, and suitably rounded upon its face which is proximate to the said bearing member to permit of adjusting movements, as just described. Passing through the wedge block is a bolt 17 which is disposed parallel with the pin 13. The two ends of the bolt may extend through slots 18 on opposite sides of the strap so as to be shiftable therein whenever required to do so by advancement of the wedge block. The bolt 17 is provided with screw threads 19, preferably V shape in cross section and relatively steep—say 20 or 22½ degrees pitch—for cooperation with threads of similar form and pitch in the wedge block 16. These threads 19 terminate slightly inside of the opposite strap sides whereby the bolt 17 is capable of a limited endwise movement, as required. I provide also a jaw 20 located within a screw-threaded socket 21 which proceeds laterally from one side of the wedge block. Within this socket is a set screw 22 having a stud 23 adapted to enter a socket 24 in the jaw whereby to advance the same against the threads of the bolt 17. A spring 25 associated with the set screw maintains thereupon a tension which acts to advance the jaw at any time that the bolt may develop a tendency toward endwise play within the wedge block. If desired, a cap 26 may be applied over the open end of the socket 21 whereby to protect the set screw therein.

The bolt 17 is provided with a cone head 27 adapted to seat within a collar 28 that is rested on the outer side of the strap 8. Additionally the head 27 is formed with an axially pointed teat 29 which receives pressure from a spring 30 which may conveniently be in the form of a leaf having a mounting as at 31 on the strap 8. It is desired that the collar remain stationary upon the strap, and for ensuring this result the former may be provided with a rib 32 which seats within a recess formed in the strap for its accommodation.

The two members 9 and 10 forming the bearing herein described may oscillate about the pin 13 as an axis whenever variations occur in the transverse position of the crank pin 11. Their interengaging curved surfaces permit this oscillatory movement regardless of the adjusted positions of these parts. As wear takes place in the member 10, due to friction from the crank pin, the wedge block 16 is free to shift so as to advance this adjustable bearing member.

With a bearing of the kind contemplated installed in the connecting rod, forces of momentum proceeding alternately in opposite directions are developed during each movement cycle of the crank pin. As the axial position of the bolt 17 remains substantially constant, there is a tendency for it to be thrust endwise one way, then the other. The presence of the collar 28 in which the cone head of the bolt is seated provides sufficient friction to resist reverse movement of the bolt in response to reactive forces of momentum. With each downward stroke of the rod A the wedge block will tend to move upward to exert an increased thrust against the bearing member 10, and during this movement the bolt 17 will be shifted slightly within the block with assistance from the spring 30 so as to maintain the block in its advanced position. Whenever the momentum force is exerted in a direction the same as is the tension of the spring 30, the bolt is free to advance provided that there is any play between the bearing member 10 and the crank pin. It is not intended that the jaw 20 should engage with the bolt with any great degree of friction, but only that it should hold the bolt firmly against one side of the threaded bore in the wedge block. It is preferred that the bolt threads have a V cross section, as shown in Fig. 4, as the chance of end play is thereby reduced to a minimum.

The entire assembly of parts forming the present take-up mechanism is simple and inexpensive, and experience has proven its value in service. I desire, therefore, that protection should be accorded as defined by the claims following in which are set forth the essentials or principles of this invention.

I claim:

1. In a bearing, the combination of a pair of members one adjustable toward the other and both adapted to journal between them a rotatable part, wedge means associated with one of said members to move the same toward the rotatable part, a bolt engaged with the wedge means and each having cooperating threads so pitched as to produce relative movement in response to a force directed endwise on the bolt, and a spring device exerting an endwise tension on the bolt such as to produce a rotation thereof relative to said wedge means, the associated bearing member being thereby held snugly against the rotatable part, substantially as described.

2. In a bearing, the combination of a pair of members between which may be journaled a rotating part, one of said members being movable toward and from the other, a wedge block co-operating with the movable member to advance the same toward the rotatable part, a bolt associated with the wedge block, there being interengaging threads on the bolt and block of a pitch sufficiently steep to produce travel of the block upon the bolt in response to pressure exerted endwise upon the latter, tension means for applying endwise pressure to the bolt, and friction means for preventing reactive retraction of the bolt to thereby maintain the wedge block in advanced position, substantially as described.

3. In a bearing, the combination of a pair of members between which may be journaled a rotating part, one of said members being movable toward and from the other, a bolt disposed transversely of the rotating part and having an enlarged cone head, an immovable collar forming a seat wherein the bolt head is frictionally held, a spring associated with the bolt and exerting a constant endwise tension thereupon, a wedge block co-operating with the bolt adapted to advance one of the bearing members toward the other, the interengaging threads of the bolt and wedge block being so pitched as to produce rotation of the bolt relative to the block when pressure is exerted endwise upon the bolt, the friction obtaining between the bolt head and its seat plus the pressure of the spring upon the bolt being sufficient to prevent retraction of the bolt in response to reactive forces working thereagainst, substantially as described.

JOHN A. ANDERSON.